US008576269B2

(12) United States Patent
Huang et al.

(10) Patent No.: US 8,576,269 B2
(45) Date of Patent: Nov. 5, 2013

(54) METHOD AND APPARATUS FOR COMMUNICATING AN IMAGE OVER A NETWORK WITH SPATIAL SCALABILITY

(75) Inventors: Xiaodong Huang, Nepean (CA); Mojtaba Hosseini, Ottawa (CA); Patrick White, Renfrew (CA)

(73) Assignee: Magor Communications Corporation, Ottawa, ON (CA)

( * ) Notice: Subject to any disclaimer, the term of this patent is extended or adjusted under 35 U.S.C. 154(b) by 343 days.

(21) Appl. No.: 12/883,366

(22) Filed: Sep. 16, 2010

(65) Prior Publication Data

US 2011/0063408 A1 Mar. 17, 2011

Related U.S. Application Data

(60) Provisional application No. 61/243,277, filed on Sep. 17, 2009.

(51) Int. Cl.
*H04N 7/14* (2006.01)

(52) U.S. Cl.
USPC ........................................ 348/14.01; 709/204

(58) Field of Classification Search
USPC ............................. 375/240.29; 382/260, 240; 348/14.01–14.09
See application file for complete search history.

(56) References Cited

U.S. PATENT DOCUMENTS

| | | | |
|---|---|---|---|
| 6,985,537 B1 * | 1/2006 | Milbar | 375/265 |
| 7,382,926 B2 * | 6/2008 | Joshi et al. | 382/240 |
| 7,876,820 B2 * | 1/2011 | Auwera et al. | 375/240.11 |
| 2002/0165961 A1 * | 11/2002 | Everdell et al. | 709/225 |
| 2005/0169379 A1 | 8/2005 | Shin et al. | |
| 2006/0013312 A1 | 1/2006 | Han | |
| 2006/0114993 A1 * | 6/2006 | Xiong et al. | 375/240.11 |
| 2008/0064425 A1 | 3/2008 | Kim et al. | |

OTHER PUBLICATIONS

"Spatial Scalability and Compression Efficiency With a Flexible Motion Compensated 3D-DWT", Nagita Mehrseresht et al., The University of New South Wales, Sydney, Australia.
"Image Coding With Rational Spatial Scalability", Gregoire Pau et al., Dept. of Image and Signal Processing, Paris, France. http://www.tsi.enst.fr/.
"A Lifting-Based Wavelet Transform Supporting Non-Dyadic Spatial Scalability", Ruiqin Xiong et al., Institute of Computing Technology, Chinese Academy of Sciences, Beijing, China, pp. 1861-1864.

* cited by examiner

*Primary Examiner* — Maria El-Zoobi
(74) *Attorney, Agent, or Firm* — Marks & Clerk; Richard J. Mitchell

(57) ABSTRACT

Visual information over a network by filtering a full resolution image signal to produce a series of sub-bands, wherein at least one of the sub-bands constitutes a base sub-band representing an image of reduced resolution and wherein additional sub-bands carry higher resolution information. At least the base sub-band is transmitted to a far end endpoint to permit image reconstruction at the far end endpoint at a degree of resolution dependent on the number of sub-bands used to reconstruct the image.

25 Claims, 6 Drawing Sheets

Video Conference Example

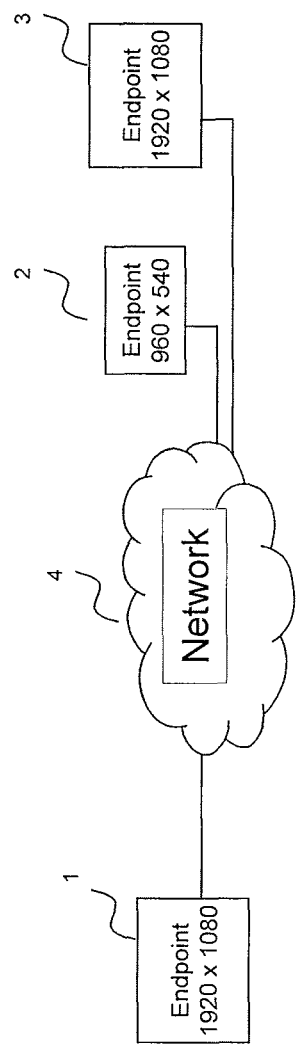

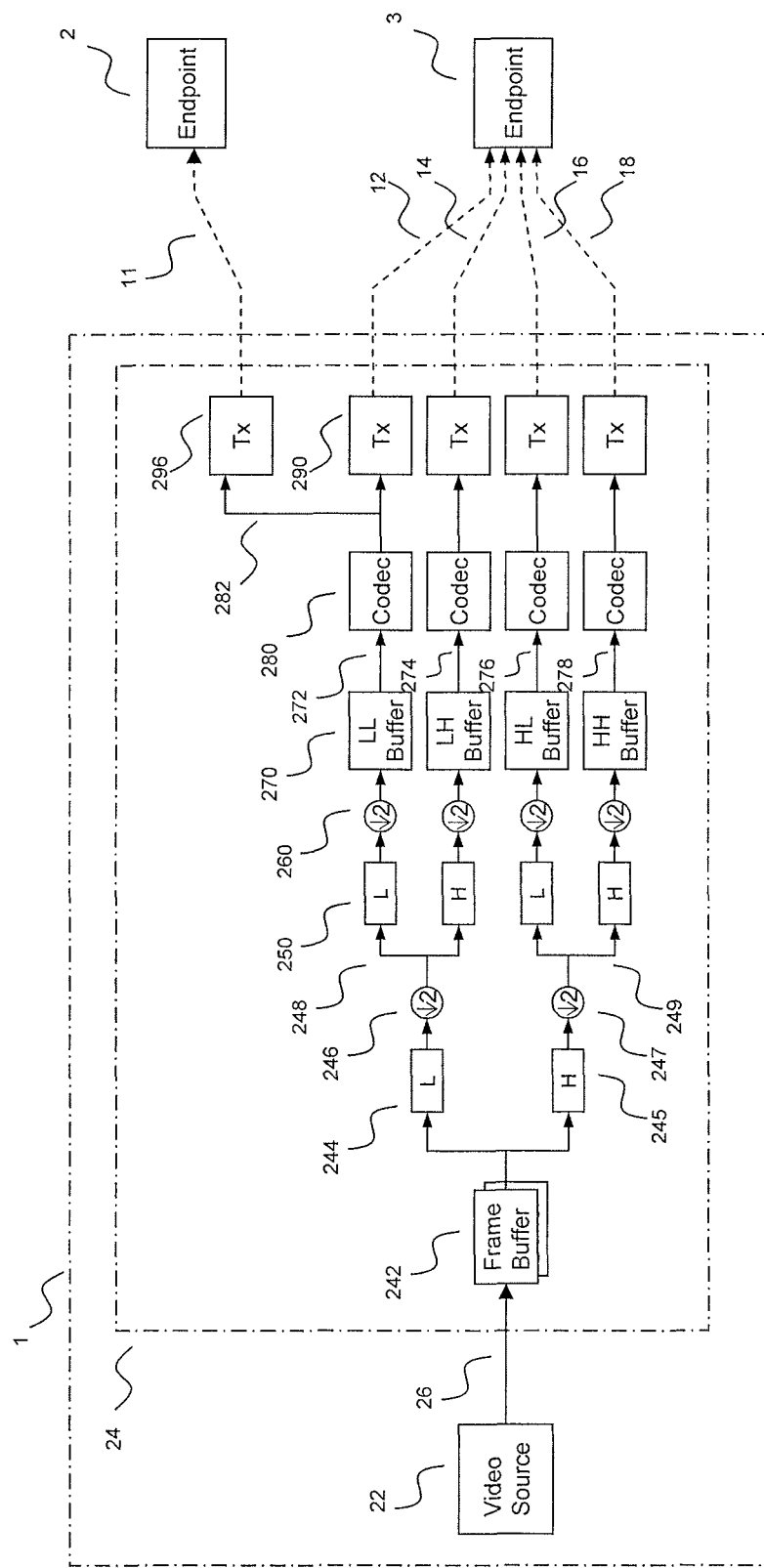
Fig 2 Source Endpoint

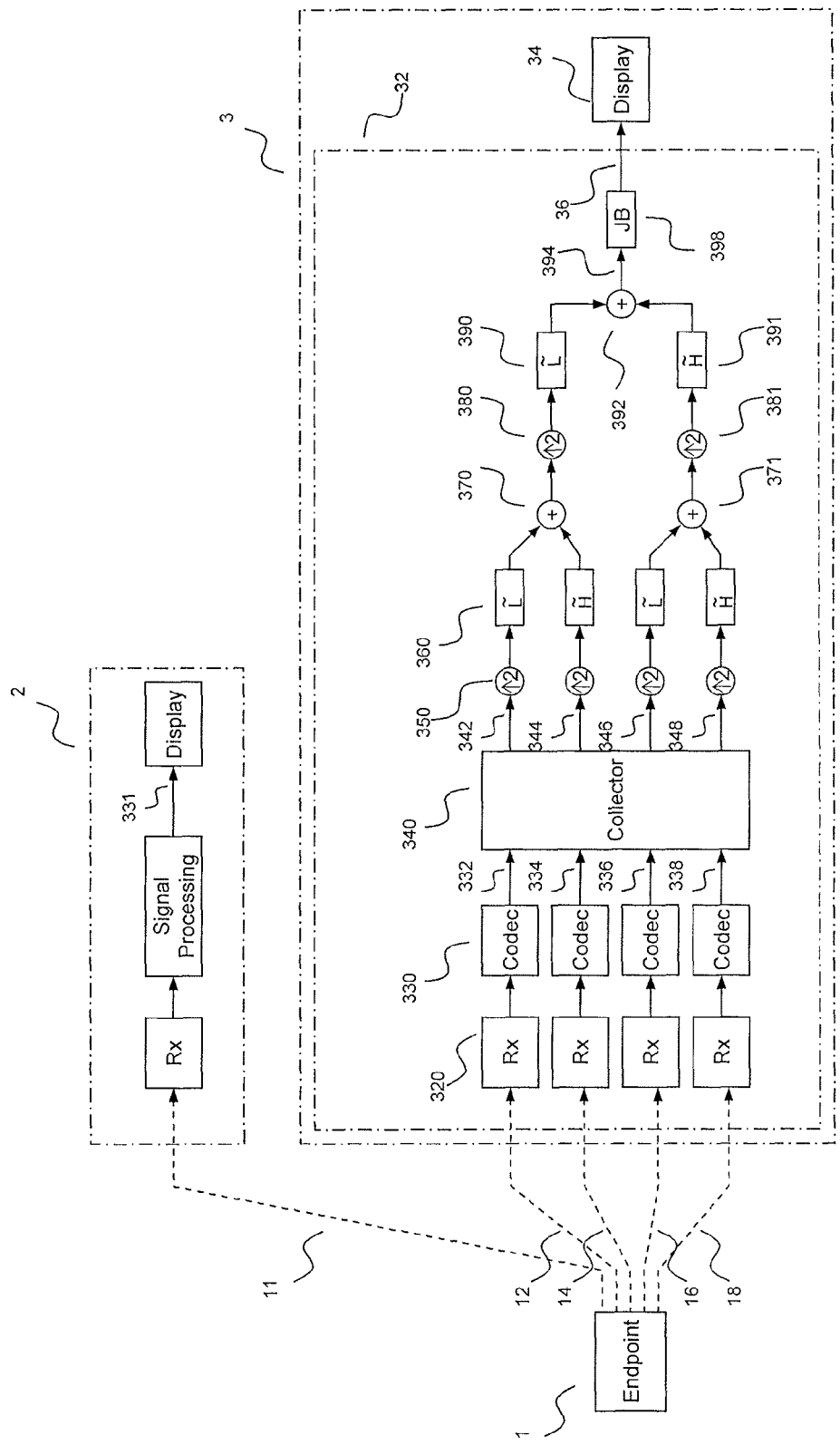
Fig 3 Destination Endpoints

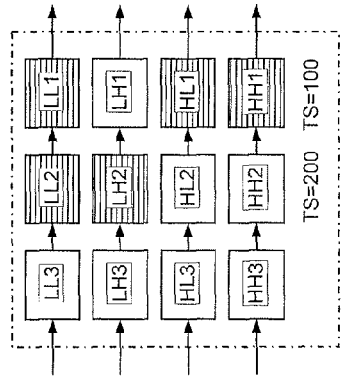
Fig 4a Example State
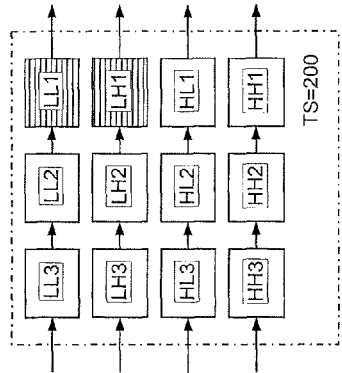
Fig 4b State after 4a if LH1 filled
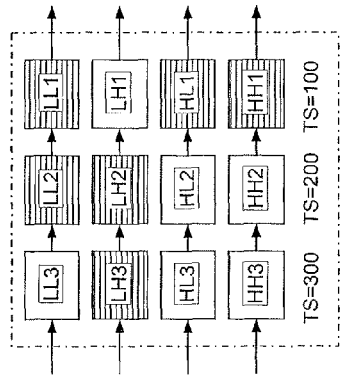
Fig 4c State after 4a if LH3 filled
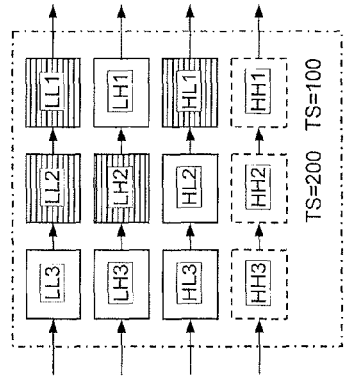
Fig 4d Example State if HH lost
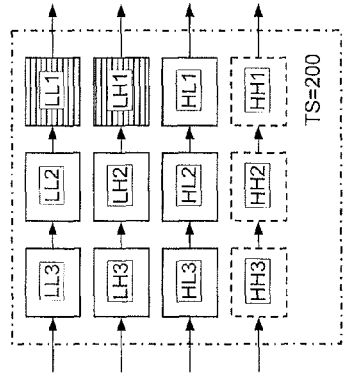
Fig 4e State after 4d if LH1 filled
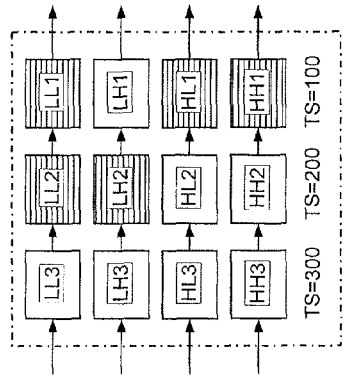
Fig 4f State after 4d if HH1 filled
Fig 4 Collector state examples

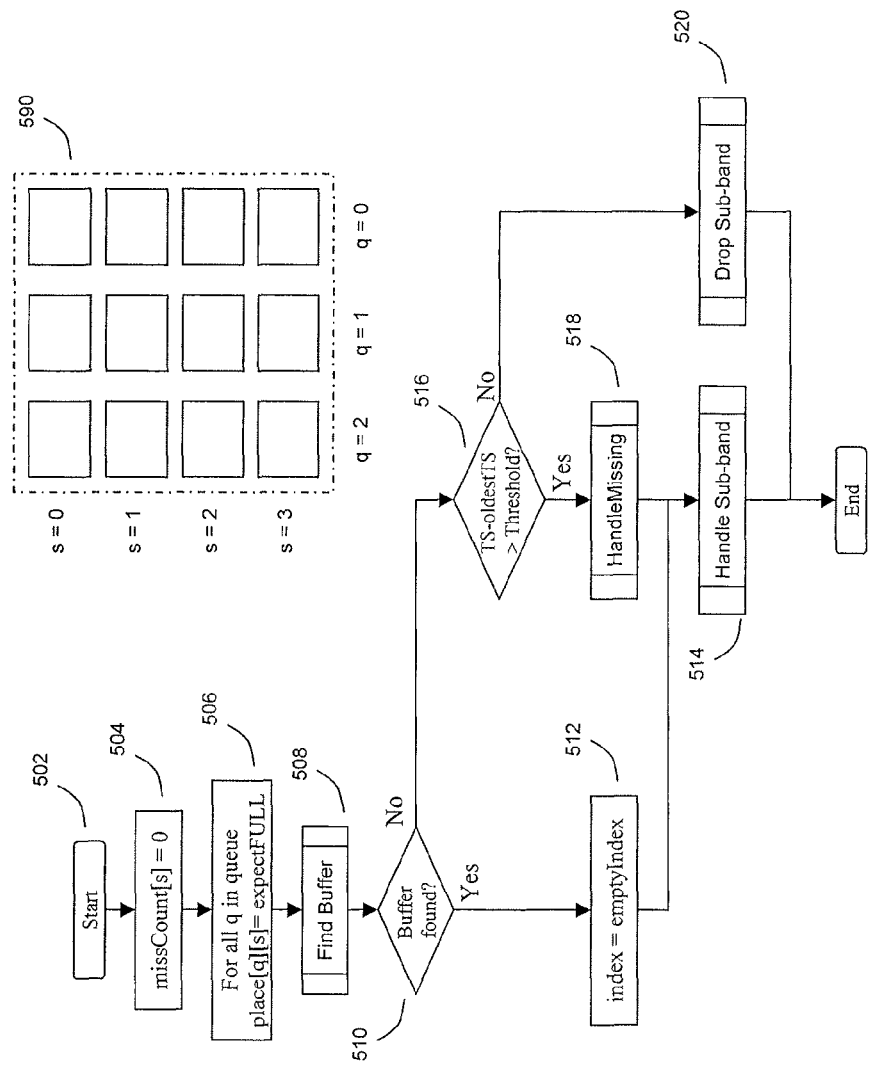
Fig 5 Collector Flow Chart

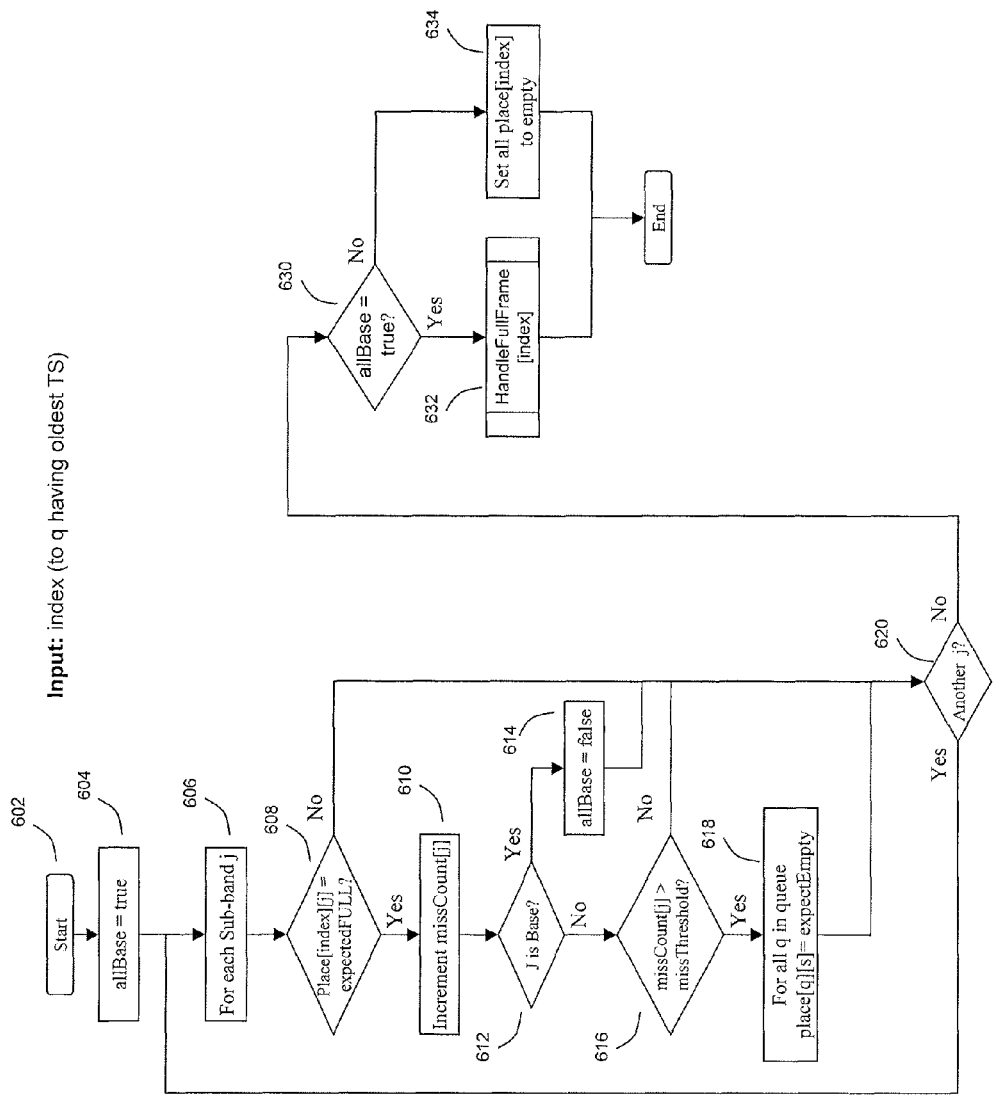
Fig 6 Flow Chart for HandleMissing procedure 518

METHOD AND APPARATUS FOR COMMUNICATING AN IMAGE OVER A NETWORK WITH SPATIAL SCALABILITY

CROSS REFERENCE TO RELATED APPLICATION

This application claims the benefit under 35 USC 119(e) of U.S. provisional application No. 61/243,277, filed Sep. 17, 2009, the contents of which are herein incorporated by reference.

FIELD OF THE INVENTION

The invention relates to the field of communicating an image, which includes video, and associated apparatus. In particular, but not exclusively, the invention relates to a method of communicating a spatial scalability image based on the capabilities or settings of an endpoint.

BACKGROUND OF THE INVENTION

Endpoints, such as multimedia user interfaces that can be communicated with over a network, can vary greatly in their capabilities. Because of this variability, when such endpoints are interconnected in a video call or multi party video conference, for example, scarce resources can be wasted encoding and transmitting a video stream with much higher quality or resolution than the distant user wishes to display or his endpoint is capable of rendering. Such scarce resources include bandwidth, which is consumed in the interconnecting shared packet network and or endpoint network connections (e.g. wireless connections, such a WiFi, cellular networks, or the like).

In addition, it is increasingly the case that the multimedia endpoint function, such as video endpoint function, is implemented on a personal computer device, or portable or handheld device (e.g. laptop, cellular device, etc.) on which the user(s) are running other applications (e.g. browsers, word processors, presentations, cellular based applications, location based applications, etc.).

In such cases scarce computational power and memory used in video processing reduce performance of other applications, and vice versa. This may be the case in both the source endpoint and destination endpoints.

For example, high end video endpoints increasingly support high definition video (known as HD or 720p, 1080i, 1080p, etc.). One example of high definition video has a resolution of 1920×1080. However, many legacy video conferencing systems are often limited to a standard known as CIF (Common Intermediate Format), which has a resolution of 352×288, and CIF multiples (e.g. 4CIF, 640×480) and submultiples. Present cellular devices, and other handheld multimedia devices, support a variety of resolutions (e.g. Nokia 176×208).

Of course, in some instances when media is being communicated to and from multiple endpoints, it may be that those multiple endpoint support different resolutions, or at least are configured to provide different resolutions.

Of course a source endpoint might adopt a lowest common denominator and simply transmit a the lowest accommodated video quality to all further endpoints. But this means users at destination endpoints, who may desire better quality suffer an unnecessarily poor video experience.

The source endpoint 1 may use a multiple of different encoders for each different resolution. However, multiple encoders has the disadvantage that more computational power is consumed at the source endpoint. Further more, if at a destination endpoint, the user decides to change the resolution (e.g. maximize a video window) it would be then necessary for source and destination endpoints to renegotiate a codec.

SUMMARY OF THE INVENTION

Generally, in accordance with the invention, prior to transmitting an image, which is typically a video signal, it is split into sub-bands using a filter bank. The video sub-bands are then separately encoded and one or more of the sub-bands is transmitted to the destination. Some sub-bands may not be transmitted, or may be lost in transmission, and the received sub-bands are reconstructed into a video stream that has a resolution dependent on the number of sub-bands received.

The sub-bands are chosen such that one or more constitute a base-band, which represents the lowest resolution version of the image. One or more additional sub-bands may be combined with the base-band to give a higher resolution image, and if all the sub-bands are recombined the image will have the same resolution as the original.

Thus, according to the present invention there is provided a method of transmitting visual information over a network comprising: filtering a full resolution image signal to produce a series of sub-bands, wherein at least one of the sub-bands constitutes a base sub-band representing an image of reduced resolution and wherein additional sub-bands carry higher resolution information; and transmitting at least the base sub-band to a far end endpoint to permit image reconstruction at the far end endpoint at a degree of resolution dependent on the number of sub-bands used to reconstruct the image The method may comprise additionally using received data of one some or all further sub-bands to allow for reconstructing the image. The received data of further sub-bands used to allow for a particular image reconstruction may be associated with the received data of the base sub-band. The received data of further sub-bands may have the same or similar time characteristics, such as a time stamp, as the received data relating to the base sub-band.

The method may comprise determining whether to use received data from one or more further sub-bands. The method may comprise determining whether to use received data from one or more further sub-bands based on the desired resolution or quality of an image to be reconstructed. The method may comprise using received data from more sub-bands for a better resolution of image, or less sub-bands for a poorer resolution. The determining may be based on the size of image to be reconstructed. The method may comprise changing the number of sub-bands used when the size of an image to be reconstructed is changed.

Received data of particular sub-bands having the same time characteristic may be considered as sub-frames. The method may comprise using one or more sub-frames to allow for reconstructing the image. The method may comprise using a sub frame of the base sub-band with one or more further sub-frames of one or more further sub-bands to allow for reconstructing the image.

The method may comprise allocating a priority to one or more of the further sub-bands. The method may comprise allowing for reconstructing the image using particular sub-frames based on the priority of the associated sub-bands. The number of sub-frames used may be less than the number desired by the desired resolution or size of a reconstructed image.

The priority may be hierarchical. The priority may be allocated based on the filtering representation provided by each particular sub-band. Higher priority sub-bands may provide higher resolution of a reconstructed image, and vice versa.

The method may comprise storing sub-frames associated with different time characterises. The method may comprise storing sub-frames in a collector. The collector may be configured to store a particular number of sub-frames relating to a particular number of time characteristics. For example, the collector may be configured to store sub-frames relating to three time characteristics.

The method may comprise discarding sub-frames relating to earliest time characteristic when the collector is full. The method may comprise discarding sub-frames relating to earliest time characteristic when the collector is full upon receipt of further data. The further data may be received data relating to the base sub-band.

In the absence of a received base sub-band, the method may comprise discarding or not using data when the base sub-band is not present in the data steam.

The method may comprise using more than one base sub-band. The method may comprise determining the presence of the base sub-band. The method may comprise determining the presence of more than one base sub-band.

The data stream may be a constant data stream. The data stream may be an intermittent data stream. The data stream may be provided in packets, such as over a packet switched network, or the like.

The image may be a video image. The image may be used to form a multimedia communication, such as a video conference. The image may comprise an audio component.

According to a second aspect of the invention there is provided a method of receiving visual information over a network from a remote endpoint offering a full resolution image signal decomposed into a series of sub-bands as separate data streams, wherein at least one of the sub-bands constitutes a base sub-band representing an image of reduced resolution and wherein additional sub-bands carry higher resolution information, comprising: determining the required resolution of an image to be displayed; establishing one or more connections to the remote endpoint to receive at least the base-band and at least as many additional sub-bands as may be required to reconstruct an image at the required resolution; and reconstructing the image at the required resolution from the received sub-band(s).

According to a third aspect of the invention there is provided An apparatus for transmitting visual information over a network comprising: a filter bank for filtering a full resolution image signal to produce a series of sub-bands, wherein at least one of the sub-bands constitutes a base sub-band representing an image of reduced resolution and wherein additional sub-bands carry higher resolution information; and one or more transmitters for transmitting at least the base sub-band to a far end endpoint to permit image reconstruction at the far end endpoint at a degree of resolution depending on the number of sub-bands used to reconstruct the image.

According to a fourth aspect of the invention there is provided an apparatus for receiving visual information over a network from a remote endpoint offering a full resolution image signal decomposed into a series of sub-bands as separate data streams, wherein at least one of the sub-bands constitutes a base sub-band representing an image of reduced resolution and wherein additional sub-bands carry higher resolution information, comprising: a series of receivers for receiving the base-band and or more additional sub-bands; a collector for temporally aligning the received sub-bands; and an inverse filter bank for recombining the received sub-bands into an image having a degree of resolution dependent on the number of sub-bands used to reconstruct the image The collector may be configured to determine the presence of received data relating to a sub-band.

The subsequent reconstruction may identify transmitted data in the base sub-band to allow for reconstruction of the image.

The method may comprise communicating a data stream to more than one location, or destination. The method may comprise receiving the communicated data stream at one or more location, or destination.

The method may comprise allowing for one particular reconstruction of the image at one destination, and a different reconstruction of the image at a different destination. The method may comprise using received transmitted data relating to the base sub-band at both destinations. The method may comprise using received transmitted data of the base sub-band at one destination, and using the received transmitted data of at the base sub-band and further sub-bands at the different destination.

The communication system may comprise a plurality of destinations. Each destination may be configured to use different amount of received data relating to the one or more sub bands.

The invention may also provided a computer readable medium, the medium configured to provide any of the features of the above aspects.

BRIEF DESCRIPTION OF THE DRAWINGS

A description is now given, by way of example only, with reference to the accompanying drawings, in which:—

FIG. 1 shows an example of a network, connecting three endpoints;

FIG. 2 shows an example of a source endpoint;

FIG. 3 shows an example of two destination endpoints having different display capabilities;

FIG. 4 shows examples of states of a collector of a destination endpoint; and

FIGS. 5 and 6 shows flowcharts of processes of a destination endpoint.

DETAILED DESCRIPTION OF EMBODIMENTS OF THE INVENTION

FIG. 1 illustrates a generic three-party video conference, comprising endpoints 1, 2 and 3, in communication with each other via a network 4. Endpoints 1, 2, 3 may be source endpoints, in that they are providing data, or destination endpoints, in that they are receiving data. Of course, endpoints 1, 2, 3 may be both source and destination endpoints.

In the example, consider that endpoints 1 and 3 support High Definition, or so-called HD (e.g. 1920×1080) video resolution, but that endpoint 2 supports for example only 960×540. This situation could arise when endpoint 2 is a legacy endpoint, in that its configuration is not the same as up-to-date endpoints. However, it could also be the case that the user of endpoint 2 has chosen to reduce a received video window in size, possibly after the introductory part of a meeting, in order to devote the majority of the display(s) to shared presentation material. To the extent that there would be no perceptible benefit in rendering an HD image in a small window resources will be wasted encoding, transmitting, and rendering an HD image in the small window.

In this example, the endpoints 1, 2, 3 are interconnected via the network 4 which is a shared packet switched network e.g. the Internet. Although such interconnections may be capable of delivering more than enough bandwidth to support transmission of the highest resolution this is not necessarily desirable to use available bandwidth because the connection is a shared resource. If an endpoint 1, 2, 3 connected via a shared network simply attempts to transmit video at the maximum resolution supported by the interconnecting network, a common approach used by circuit switch connected endpoints, then other users of the shared parts of the network will be affected.

For example, the maximum number of independent calls supported by any given segment of the network may be reduced if calls consume great bandwidth. In which case, the performance seen by non-real time users will be reduced, for example web pages will be slow to load, downloads will take longer.

Therefore, in this instance it may be desirable to try to reduce or minimise the total bandwidth consumed by the connections between video source (e.g. endpoint 1) and number of video destinations (e.g. endpoints 2 and 3), particularly when some of the destinations are not capable, or users do not desire, the full quality of the source video (e.g. endpoint 2). Furthermore, it might be desirable to try to reduce endpoint processing resource, for example processing resource consumed at the source where the source video is encoded only once (known in the industry as video scalability).

As discussed, FIG. 1 illustrates the example of a 3 party video conference employing 3 endpoints interconnected via the network, but of more endpoints 1, 2, 3 may be used. Similarly, it will be appreciated that the network 4 may be any type of network, such as any packet switched network. For example, the network may be an IP network, which could for example be a private (corporate) network, public network (e.g. the Internet) or a combination of public and private networks, etc.

In this embodiment video media streams are encoded, transmitted and decoded. Here, this is achieved after a video call is set up. Video calls, including media streams etc., can readily be set up using known methods. Similarly, call setups may use any standardized protocols, for example standardized protocols for use in the case of setting up a call to a legacy endpoint.

Call setups may employ proprietary protocols to optimize the operation of the communication network. Such a protocol may allow for destination endpoints to send to the source endpoint date or information about its capabilities, resources, users needs, etc.

In the following description transmission of video sourced at endpoint 1 and displayed at endpoints 2 and 3 will be considered. However, a similar method could be used to transmit video from endpoints 2 and 3 to other endpoints. Endpoints may contain many other functions other than those described in detail, such as means to set up calls and to handle the audio portion of the call.

FIG. 2 illustrates features of the source endpoint 1. Receive video processing and other functions have been omitted for clarity.

Endpoint 1 contains two principle functions: a Video Source 22 and Video Processor 24. The Processor 24 receives a video signal from source 22. In this example, the processor is configured to connect to endpoint 2 via a single IP connection 11, and to endpoint 3 via four IP connections 12.

Vidon Source 22 could be a single video camera or multiple cameras mixed or switched to a single output signal 26. It could also be, or include, output from a video recording device. The resulting signal 26 in this embodiment is an HD (1920×1080) video stream.

The processor is further configured as a filter bank.

In this example, filter bank structure involves filtering a signal f with a lowpass filter 244 and a highpass filter 245 respectively, then downsampling each of them by two in down samplers 246, 247. This can be considered to be an analysis or decomposition stage. As will be described, a following synthesis or reconstruction stage, in which both of the above filtered/downsampled signals can are upsampled by two (cf. FIGS. 3, 380 and 381), filtered by a lowpass filter $\tilde{L}$ (cf. FIG. 3, 390) and a highpass filter $\tilde{H}$ (cf. FIG. 3, 391) respectively, and which then are summed to these two filtered outputs (cf. FIG. 3, 392) together to provide a final reconstructed signal $\hat{f}$.

Theoretically, a perfect reconstruction (PR, $f=\hat{f}$) can be reached if the following two conditions are met:

$$L(z)\tilde{L}(z)+H(z)\tilde{H}(z)=2$$

$$L(-z)\tilde{L}(z)+H(-z)\tilde{H}(z)=0$$

where $L(z)$, $\tilde{L}(z)$, $H(z)$ and $\tilde{H}(z)$ are the z-transform of the filters L, $\tilde{L}$, H and $\tilde{H}$ respectively.

For the application of filter bank on images, e.g. compression, the above decomposition/reconstruction stages are applied twice respectively: one on the rows of the image (cf. FIGS. 2, 244 and 245; FIGS. 3, 390 and 391), another on the columns of the image (cf. FIG. 2, 250; FIG. 3, 360).

For image compression using such a filter bank approach, the coding process can be applied on four sub-bands LL, LH, HL and HH after the decomposition stage.

Here, it is possible to separate scalable video coding property from the codec itself, i.e., codec independent.

In this embodiment the endpoint uses H.264 or MPEG4 for the coding of each sub-bands. In some examples, the LL band has more energy concentration in which the pixel values range between [0,255], and LH, HL and HH subbands have less energy concentration (high frequency components along edges) with pixel values range between [−128,+128].

For actual image and video signals, the order of energy concentration for these four subbands is LL>LH>HL>HH. Therefore, the coding of LL can be done as usual video coding process, while a constant—128—can be added to LH, HL and HH subbands before putting them into a standard video codec.

Since the LL subband has the most energy concentration, more bandwidth can be allocated to its coded bitstream; on the other hand, the HH has the least energy concentration compared to other subbands, and thus the less or even the least bandwidth allocation may be provided. To add error resiliency, higher bands with errors or not received can be discarded.

Using the filter bank technology blocks 244 to 260 it is possible to constitute an analysis filter bank. In this example, the contents of the frame buffer 242 are processed to fill four buffers 270, each one quarter the size of frame buffer 242. It will be appreciated that quarter size is not necessary. In further example, non-dyadic filter banks with appropriate downsampling would work just as well.

In the first stage a low band signal 248 is the result of processing the contents of frame buffer 242 via low pass filter 244 and down-sampler 246. Similarly signal 249 is the result of processing the contents of 242 via a high pass filter 245 and down-sampler 247. In one embodiment the low pass decomposition filter 244, the high pass decomposition filter 245, the low pass reconstruction filter 390, as well as the high pass reconstruction filter 391, are either Haar filter banks, or biorthogonal 9-7 (CDF917) filter banks.

In the second stage the low and high band signals 248 and 249 are similarly further sub-banded by four filters 250 and down-samplers 260 resulting in 4 buffers containing signals 270 designated as LL, LH, HL and HH. The buffers 270 are 4 sub-bands of one frame of the original signal 26.

At this point the resulting four signals 272 are each treated as a separate video signals, unrelated to the other three. A remote device may connect to one, some, or all these video signals.

That is to say during call set up with endpoint 2, which is a legacy endpoint, the Codec type, e.g. H.264, is negotiated. Then the LL video signal 272 is encoded in block 280. The resulting compressed video signal 282 is connected to IP transmitter 296 then via the virtual IP connection 11 to endpoint 2. It will be understand in this connection that the transmitters TX might simply be ports terminating a TCP/IP virtual connection.

It will be apparent that the LL buffer contains one frame of video which is a low resolution version (e.g. 960×540) of the original frame (e.g. 1920×1080) contained in buffer 242.

To simplify the explanation, endpoint 2 was chosen to have exactly one quarter the resolution of source endpoint 1. In general the filter bank may be configured dynamically during call setup so that the LL buffer approximately matches the resolution of the endpoint having the lowest resolution. In that case decoders may be renegotiated.

For example consider the example when endpoint 2 is a legacy 640×480 video conference unit, then the analysis filter bank is configured such that there are nine 640×360 buffers 270 each one third the horizontal and vertical resolution of Frame Buffer 242. In that example, the filter bank may be setup just once and not renegotiated. A scalable video encoder provides some levels but not every size fits perfectly. It does the best it can. So if the filter bank has been setup with its LL being 960×540, then an endpoint requiring 640×480 will receive 960×540.

In a similar fashion endpoint 3, the detailed operation of which will be described below, connects to all 4 signals 272, i.e. LL Buffer results in IP signal 12, LH in 14, HL in 16 and HH in 18. In this example it is assumed that endpoint 3 negotiates the same LL codec, (e.g. H.264), as did endpoint 2.

Referring now to FIG. 3 the destination endpoints are illustrated. endpoint 2 will be recognized as a video endpoint employing signal processing operating according to known methods.

Endpoint 3 comprises two principal functions, a display 34 and DestinationVideo Processor functions 32.

In the initial stages of operation, Receivers 320 and Codecs 330, of endpoint 3 for each of the 4 signals 12, 14, 16 and 18 are similar to the corresponding operations in endpoint 2 where IP signal 11 results in displayable video signal 331. In fact, signal 332 and 331 are both copies of signal 272 (cf. FIG. 2) delayed and degraded as a result of transmission impairments. Similarly signals 334, 335 and 336 are copies of the signals 274, 276 and 278 each differently delayed and degraded as a result of transmission impairments unique to the specific connection. These signals are then processed by Collector 340 the operation of which will be described in more detail below. The purpose of Collector 340 is to optimize the signals 342, 344, 346 and 348 so that despite transmission impairments they reproduce signals 272, 274, 276 and 278 respectively most faithfully and with equal delay, i.e. frames are aligned according to timestamp.

The remaining stages of the receive video processor 32 will be understood from filter bank technology described above. Blocks 360 to 392 are the synthesis filter bank, corresponding to the analysis filter bank in source endpoint 1. As discussed, the synthesis and analysis banks may be designed for perfect reconstruction.

Collector 340 will now be described in more detail. The Collector in the example embodiment comprises four parallel first-in-first-out (FIFO) buffers, one for each sub-band (e.g. input signal 332-338, output signal 342-348 respectively). The signal, or contents referred to below, comprises a succession of single video frame sub-bands or sub-frames.

The operation of the Collector is illustrated using flow charts of an exemplary embodiment of the invention.

FIG. 5 is a flow chart of an exemplary Collector main handling procedure. This procedure is invoked at 502 each time a new sub-frame arrives on one of the sub-band 332, 334, 336, or 338. In this figure a sub-band is referred to by an index [s] (these correspond to one of LL, LH, HL or HH used more specific example below). The new sub-frame has a position characteristic, which is associated with the time of the frame in a video sequence. In this example, a time stamp is used, or so-called TS property, which is used to determine where it is to be placed (or if it is to be discarded) in the Collector queue associated with the sub-band.

Sub-bands are referred to by an index [q] (this corresponds to column 1, 2, or 3 used later specific example). This memory buffer addressing nomenclature is illustrated graphically 590. Each container in the buffer is referred to as place[q][s]. Once the new sub-frame is placed in the Collector other buffer management actions may be invoked as follows.

Since the procedure has been invoked by a sub-frame arriving on a given sub-band then a counter missCount[s] for that sub-band is zeroed 504 and all buffers in that sub-band queue are flagged expectedFULL 506. These variables are used when this procedure is later called by the arrival of sub-frames on other sub-bands (see FIG. 6).

Next a procedure Find Buffer 508 will determine the emptyIndex of the queue level [q] into which the new sub-frame is to be placed. It is set to the [q] if any having a TS equal to the new sub-frame TS. Failing this it is set to the next empty [q] level or failing this the procedure 508 reports no buffer found and also determines the value of the oldest TS in the queue, oldestTS and which queue level it is at, oldestIndex.

In the normal case where 508 reported a buffer found, decision block 510 moves execution to 512 setting the identified emptyIndex into variable qIndex used in subsequent steps.

In the case where 508 reported no buffer found, decision block 510 moves execution to further decision 516. If the TS of the newly arriving sub-frame is much newer then the oldestTS by the amount of a predetermined threshold (200 ms for example) then execution proceeds to 518 where the oldest sub-frames are discarded. If not then the newly arriving sub-frame, which is in fact quite old, is simply discarded at 520 with no further action.

Procedure 518 will be described in more detail later. Either via 512 or 518, both of which result in the index of the queue level where the newly arriving sub-frame is to be placed, execution proceeds to Handle Sub-band 514 where the sub-frame is copied into the place specified by the index and sub-band.

Within 514, if the new sub-frame, pointed to by index, completes a set of expectedFull sub-frames then reconstruction is initiated. The associated Collector buffers, and any having earlier TS are all set to empty. This completes the process.

FIG. 6 is a flow chart detailing the HandleMissing procedure 518. It is called with parameter index=the queue q having the oldest TS. This procedure re-evaluates expectedFULL for each non-Base sub-band. If the partial frame can now be displayed then it is, otherwise the partial frame is discarded.

Either way the procedure in this example exits with an empty level in the Collector into which the new sub-frame can be placed 514.

FIG. 6 includes a loop 606-620 stepping through each sub-band j. If the buffer (place[index][j]) is not expectedFull 608 then execution proceeds to the next j, otherwise miscount [j] for this sub-band in incremented. If this sub-band, j, is a "Base" 612 then the frame can not be reconstructed, this is flagged 614 for use after the loop. Otherwise if the misscount has exceeded a predetermined threshold, step 616, then the entire queue for the sub-band is marked expectEmpty 618. In the preferred embodiment this threshold is 6. At 620, the end of the loop, if all sub-bands have been processed then execution proceeds to 630 where the allBase flag is tested. If the subject frame now contains all base sub-frames then the frame is reconstructed 632, if not the frame is discarded 634. This ends this procedure. HandleFullFrame 632 initiates the reconstruction following which the associated Collector buffers, and any having earlier TS are all set to empty.

Referring to FIG. 4a by way of an example, an embodiment of the Collector is described. In it FIFOs are illustrated using the common "pipeline" analogy (any well known implementation method may be used). Labels (LL1) etc. refer to the FIFO container levels (not the contents). In a typical FIFO arriving contents fill the left hand container then "flow" to the right until there is no empty container on its right. When contents are removed from the right hand side remaining contents all shift right (like the balls in a lottery machine).

The parallel FIFOs of the Collector do not however operate independently; rather the contents of each level are aligned on the basis of content timestamp (TS). All contents at a given level (vertical), if not empty, will have the same TS. This requires typical FIFO operation to be modified. New contents will "flow" right until there is no empty column of containers to its right except when the TS of the new content correspond to the TS of an existing container to the right. In such a case the new content will hop into that container, which should be empty. This is necessary to accommodate IP transmission impairments known as lost (or late) packets and packets arriving out of sequence.

Specific examples in FIG. 4 will clarify this operation. FIG. 4a shows one exemplary state. This state could have been arrived at from an initial empty state after the sequential arrival of 6 sub-frames; 3 with a common TS (filling LL1, HL1 and HH1) and two having a newer TS (filling LL2 and LH2). It will be understood from the foregoing that these sub-frames could have arrived in any order providing that one of the sub-frames having the oldest TS (value=100) arrived first.

FIG. 4b illustrates the Collector state after 4a following the arrival of a sub-frame in the LH sub-band having TS equal to 100 (i.e. the oldest sub-frames in the Collector). Upon arrival this sub-frame will "hop" into LH1. This results in all containers in level 1 being full. When all containers in level 1 are full their contents are output (essentially in parallel) for reconstruction (up-sampling 350 starting reconstruction through to the jitter buffer 398 as described earlier). Following this, the contents of level 2, TS=200, will move right into the now empty level 1.

Alternatively, if state of FIG. 4a is followed by the arrival of a sub-frame in the LH sub-band having a newer TS, e.g. TS=300, it will be placed in LH3 and there will be no further action.

Another aspect of the Collector allows for sub-frames to be reconstructed and displayed even if all the desired sub-frames having a particular TS have not arrived in time due to transmission impairments. This will be understood from the purpose of the invention which allows low resolution images to be displayed on the example endpoint 2. In this example, such reconstruction is possible provided that all Base Sub-Frames have arrived. By way of example, base sub-frames are those that are used for the partial reconstruction of the image.

The Collector FIFOs have a predetermined depth. For illustrative purposes the Collector has a depth of three. Of course, this is exemplary only, and in a further embodiment the Collector depth is 6 (at 30 fps the FIFO will hold 198 ms of video) but of course other values could be used.

If all levels contain at least one sub-frame, each of different TS, and a new sub-frame arrives, on any sub-hand, having a unique, later, TS, then space for it will be made as follows. If all base sub-frames are present in level 1 (LL1 in this example is sufficient) the contents of level 1 is output for reconstruction. If base sub-frames are not all present then the entire fragmented frame (column) is discarded. Either way, FIFO level 1 is emptied and other levels can move right. Space is now available for the new sub-frame to be placed in level 3.

When an incomplete frame is reconstructed in this way the missing sub-band(s) in the Collector are flagged as Expected-empty and will remain this way until the timely arrival of a sub-frame in the Expected-empty sub-band whereupon the flag is removed. This allows for the timely reconstruction of frames in the presence of a run of missing sub-frames. Video will be temporarily degraded but not lost.

FIG. 4d illustrates an exemplary Collector state according to this aspect of the invention. In the Figure the HH sub-band has been missing for an indeterminate period of time and is flagged as Expected-empty. If now a sub-frame in the LH sub-band having TS=100 arrives then it is popped into LH1 and level 1 is output for reconstruction resulting in the Collector state shown in FIG. 4e.

Alternatively, if after the state of 4d then next new sub-frame is in sub-band HH with a TS equal to (or later than) the oldest TS currently in the Collector then it will be placed in the appropriate container. This is illustrated in 4f. The new HH sub-frame having TS=100 is placed in HH1 and the HH sub-band now becomes Expected-full.

This however does not result in a reconstruction because LH1 is still empty and expected full.

Of course, in the example chosen to illustrate one embodiment of the invention, all 4 signals 342, 344, 346 and 348 are respectively 2× up-sampled 360, but 2× is only one particular instance. Filters 360 are the complement of source filters 250 respectively. The output of the two low sub-band filters are additively mixed 370, similarly the outputs of the two high sub-band filters are additively mixed 371. These two signals are respectively 2× up-sampled 380. Filters 390 and 391, having characteristics complementary to source filters 244 and 245 respectively, process up-sampled signals after which they are additively mixed 392 to output the reconstructed HD video signal 394 which in ideal conditions is a delayed copy of the source video signal 26. Again the number of signals to be recombined at the destination endpoint to render the full resolution of the original source video is not necessarily four, but is equal to the number of sub-bands generated at the source endpoint, i.e. equal to the number of sub-band buffers 270.

Video Stream 26 is first stored in a Frame Buffer 242. In one embodiment this is one of two buffers which are filled on alternate frames. While one Frame Buffer is being filled the contents of the other are processed.

A reader skilled in the art would understand that depending on implementation detail some or all signals shown in source and destination video processors 24 and 32 (i.e. all solid arrows) may be buffered (or double buffered). Or, alternatively, multiple signal processing functions may be processed in a single procedure requiring less frequent buffering. Buffers have been omitted for clarity in the figures.

In addition to missing sub-bands determining the 'expect Full or empty', an out of band mechanism (for example an explicit message from the sender) can set the expect Full or empty flag for the queue.

In one embodiment four sub-bands are used. It will be evident that the number of sub-bands may be increased or decreased by adding stages of filter banks, or otherwise redesigning the filter-banks in well known ways. This structure could be dynamic, that is to say that the number of sub-bands could be determined at call setup time rather than being fixed in a given endpoint.

That is to say that any of the apparatus described may comprise hardware circuitry and/or firmware, for example a field programmable gate array, application specific integrated circuit, etc. The apparatus may comprise software loaded onto memory, e.g. memory comprised with a processor or the like. The processor and memory may have uses in addition to those described. For example, the apparatus may be implemented on a personal computer, laptop, cellular device, portable multimedia device, etc.

It will be appreciated by the skilled reader that any circuitry, or features of particular apparatus may be provided by apparatus arranged such that they become configured to carry out the desired operations only when enabled (e.g. switched on), or the like. In such cases, they may not necessarily have the appropriate software loaded into the active memory in the non-enabled state (e.g. switched off state) and only load the appropriate software in the enabled state (e.g. switched on state).

As has been described, prior to transmitting a video signal it may be first split into sub-bands using a filter bank. In the example described, sub-bands, such as video sub-bands, are then separately encoded using an encoder. These one or more video sub-bands are transmitted to the destination.

Of course, some sub-bands may be lost in transmission. However, those that are received can be reconstructed into a video stream for display.

Sub-bands are chosen such that one or more constitute a "Base". Base sub-bands may be used in reconstruction with or without non-Base sub-bands. Using only Base sub-bands results in an image of lower resolution. If more than one sub-band is used then all sub-bands are re-aligned before re-construction. If all sub-bands are used in reconstruction video of quality is similar, if not equal, to the quality of the original video signal.

A skilled reader will appreciate that the above described approach can be codec independent. That is to say that it can work with any codec (e.g. H264, H263, MPEG4, MPEG2, MPEG1, future codec, H264 Scalable Video Coding (SVC)) as opposed to using the filter banks within the encoder, which may be codec dependent. In addition, there is provided a low delay since each sub-band is encoded independently and does not depend on encoding of other layers. Similarly, the embodiment can be implementation independent. That is to say that once implemented any implementation of H264 AVC or SVC can be used in conjunction with it to have spatial scalability.

The above described embodiment may be considered to allow for spatially scalable video.

It will be appreciated that any of the aforementioned circuit apparatus, devices, etc., may have other functions in addition to the mentioned functions, and that these functions may be performed by the same circuit/apparatus/devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention.

For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims any means-plus-function clauses are intended to cover the structures described herein as performing the recited function and not only structural equivalents, but also equivalent structures.

We claim:

1. A method of transmitting video information over a network comprising:
   temporarily storing a full resolution video signal in a frame buffer;
   filtering the full resolution video signal by passing said full resolution video signal from the frame buffer through a filter bank to a series of buffers containing sub-banded video signals, said filter bank including pairs of high pass and low pass filters arranged in a cascaded arrangement, each pair of filters being followed by a downsampler, said filter bank being configured such that at least one of the sub-bands constitutes a base sub-band representing a video image of reduced resolution and additional sub-bands carry higher resolution information;
   passing the sub-band video signals through respective separate code operating independently of each other to encode the sub-bands in parallel into a series of encoded sub-bands for transmission as separate video streams over the network; and
   transmitting at least the encoded base sub-band to a far end endpoint to permit video reconstruction at the far end endpoint at a degree of resolution dependent on the number of sub-bands used to reconstruct the video image.

2. The method of claim 1, wherein only the base sub-band is transmitted to the far end endpoint to permit reconstruction of said image of reduced resolution.

3. The method of claim 1, wherein one or more said additional sub-bands are transmitted to the far end endpoint to permit reconstruction of an image of increased resolution relative to said image of reduced resolution.

4. The method of claim 3, wherein all said sub-bands are transmitted to the far end endpoint to permit reconstruction of an image at full resolution.

5. The method of claim 1, wherein the sub-bands are dynamically configurable so that the image resolution conveyed by the base sub-band matches the resolution of an endpoint in the network having the lowest resolution.

6. The method of claim 1, wherein sub-frames contained in the sub-bands are transmitted with a timestamp.

7. The method of claim 1, wherein a virtual connection is established between one or more of said respective codecs and the far end endpoint.

8. The method of claim 1, wherein the far end endpoint forms part of a video conference.

9. A method of receiving visual information over a network from a remote endpoint offering a full resolution image signal decomposed into a series of encoded sub-bands as separate data streams, wherein at least one of the encoded sub-bands constitutes an encoded base sub-band representing an image of reduced resolution and wherein additional encoded sub-bands carry higher resolution information, comprising:
determining the required resolution of an image to be displayed;
establishing two or more connections to the remote endpoint to receive at least the encoded base-band and at least one additional encoded sub-bands to reconstruct an image at the required resolution;
decoding the received encoded sub-bands in a parallel arrangement of separate decoders operating independently of each other to produce a plurality of image signals corresponding to said respective encoded sub-bands;
temporally aligning the parallel image signals in a collector; and
passing said image signals through an inverse filter bank comprising cascaded pairs of high and low pass filters followed upsamplers to reconstruct the image at the required resolution.

10. The method of claim 9, wherein all said sub-bands are received, and an image at full resolution is reconstructed by recombining the sub-bands.

11. The method of claim 9, wherein the sub-frames are aligned in the collector based on timestamps associated with the sub-frames.

12. The method of claim 9, wherein the sub-frames are stored in buffers and read out of the buffers in temporal alignment.

13. The method of claim 12, wherein the buffers are FIFO (First-In, First-Out) memories, and the sub-frames are shifted through the FIFOs in temporal alignment.

14. The method of claim 13, wherein if a newly arrived sub-frame is newer than the oldest sub-frame in the buffer by a pre-determined threshold, the oldest sub-frames in the buffer are discarded.

15. The method of claim 9, wherein the remote endpoint forms part of a video conference.

16. An apparatus for transmitting visual information over a network comprising:
a filter bank for filtering a full resolution image signal to produce a series of sub-bands, wherein at least one of the sub-bands constitutes a base sub-band representing an image of reduced resolution and wherein additional sub-bands carry higher resolution information;
a plurality of separate encoders in parallel configured to operate independently of each other to encode said respective sub-bands; and
one or more transmitters for transmitting at least the encoded base sub-band to a far end endpoint to permit image reconstruction at the far end endpoint at a degree of resolution depending on the number of sub-bands used to reconstruct the image,
wherein the sub-bands are dynamically configurable so that the image resolution conveyed by the base sub-band matches the resolution of an endpoint in the network having the lowest resolution.

17. An apparatus for transmitting visual information over a network comprising:
a filter bank for filtering a full resolution image signal to produce a series of sub-bands, wherein at least one of the sub-bands constitutes a base sub-band representing an image of reduced resolution and wherein additional sub-bands carry higher resolution information;
a plurality of separate encoders in parallel configured to operate independently of each other to encode said respective sub-bands; and
one or more transmitters for transmitting at least the encoded base sub-band to a far end endpoint to permit image reconstruction at the far end endpoint at a degree of resolution depending on the number of sub-bands used to reconstruct the image,
wherein the filter bank comprises a cascaded arrangement of pairs of high and low pass filters and a series of buffers for temporarily storing data in each sub-band.

18. The apparatus of claim 16, further comprising a series of encoders connected to outputs the respective buffers for preparing data in the sub-bands for transmission over the network.

19. The apparatus of claim 16, wherein said one or more transmitters comprise terminations of virtual connections over the network.

20. The apparatus of claim 16, which is part of a videoconferencing system.

21. An apparatus for receiving visual information over a network from a remote endpoint offering a full resolution image signal decomposed into a series of encoded sub-bands as separate data streams, wherein at least one of the encoded sub-bands constitutes an encoded base sub-band representing an image of reduced resolution and wherein additional encoded sub-bands carry higher resolution information, comprising:
a plurality of receivers for receiving the encoded base-band and or more additional encoded sub-bands;
a parallel arrangement of separate decoders configured to operate independently of each other and to produce a series of parallel image signals corresponding to said respective encoded sub-bands;
a collector for temporally aligning the parallel image signals; and
an inverse filter bank for recombining the aligned image signals into an image having a degree of resolution dependent on the number of sub-bands used to reconstruct the image, said inverse filter bank comprising cascaded pairs of high and low pass filters followed by upsamplers.

22. The apparatus of claim 21, wherein the collector comprises parallel groups of buffers for temporarily storing the incoming sub-frames and wherein the collector is configured to place the incoming sub-frames in order in the buffers based on timestamps associated with the respective sub-frames and read them out in temporal alignment.

23. The apparatus of claim 22, wherein the collector is configured to discard the sub-frames with the oldest timestamps when a newly arrived sub-frame has a timestamp that is newer by predetermined threshold than the oldest sub-frames.

24. The apparatus of claim 21, wherein the receivers comprise terminations of virtual connections over the network.

25. The apparatus of claim 21, wherein the apparatus forms part of a video conferencing system.

\* \* \* \* \*